US012739743B2

(12) United States Patent
Thai et al.

(10) Patent No.: US 12,739,743 B2
(45) Date of Patent: Sep. 15, 2026

(54) INTEGRATED COMMUNICATION SYSTEM AND COMMUNICATION METHOD THEREOF IN COMMUNICATION SYSTEM

(71) Applicant: ELECTRONICS AND TELECOMMUNICATIONS RESEARCH INSTITUTE, Daejeon (KR)

(72) Inventors: Quang Tung Thai, Daejeon (KR); Namseok Ko, Daejeon (KR); Sun Me Kim, Daejeon (KR); No Ik Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 399 days.

(21) Appl. No.: 18/236,998

(22) Filed: Aug. 23, 2023

(65) Prior Publication Data

US 2024/0073806 A1 Feb. 29, 2024

(30) Foreign Application Priority Data

Aug. 23, 2022 (KR) ........................ 10-2022-0105288
Aug. 31, 2022 (KR) ........................ 10-2022-0109865
Jul. 31, 2023 (KR) ........................ 10-2023-0099581

(51) Int. Cl.
*H04W 60/00* (2009.01)
*H04W 48/00* (2009.01)
*H04W 48/20* (2009.01)

(52) U.S. Cl.
CPC ........... *H04W 48/20* (2013.01); *H04W 48/17* (2013.01); *H04W 60/00* (2013.01)

(58) Field of Classification Search
None
See application file for complete search history.

(56) References Cited

U.S. PATENT DOCUMENTS

2019/0098104 A1 3/2019 Kim et al.
2021/0127265 A1* 4/2021 Chandramouli ...... H04W 12/08
2021/0367854 A1 11/2021 Lee
2022/0053372 A1* 2/2022 Shekhar .................. H04L 67/56
2023/0261953 A1* 8/2023 Lu ....................... H04L 41/5054
709/223

(Continued)

FOREIGN PATENT DOCUMENTS

WO 2022/028984 A1 2/2022

OTHER PUBLICATIONS

3GPP, 3rd Generation Partnership Project; Technical Specification Group Services and System Aspects; System architecture for the 5G System (5GS); Stage 2 (Release 17) 3GPP TS 23.501 V17.5.0 (Jun. 2022).

*Primary Examiner* — Jenkey Van
(74) *Attorney, Agent, or Firm* — LRK PATENT LAW FIRM

(57) ABSTRACT

Proposed is a network function of the integrated communication system which performs connection between NFs through receiving a request of a service and information about a service agent to provide the service from a business logic of the network function, and receiving a connection object for connecting to the service agent and connecting to a service agent in another network function by using the connection object.

14 Claims, 9 Drawing Sheets

(56) References Cited

U.S. PATENT DOCUMENTS

2023/0291809 A1* 9/2023 Lu ........................ H04L 67/563
2023/0292274 A1* 9/2023 Jayaramachar ......... H04L 41/40
2023/0300215 A1* 9/2023 Bartolome Rodrigo .................... H04L 67/567 709/203
2024/0073095 A1* 2/2024 Yang .................. H04L 41/0893

* cited by examiner

Figure 5:
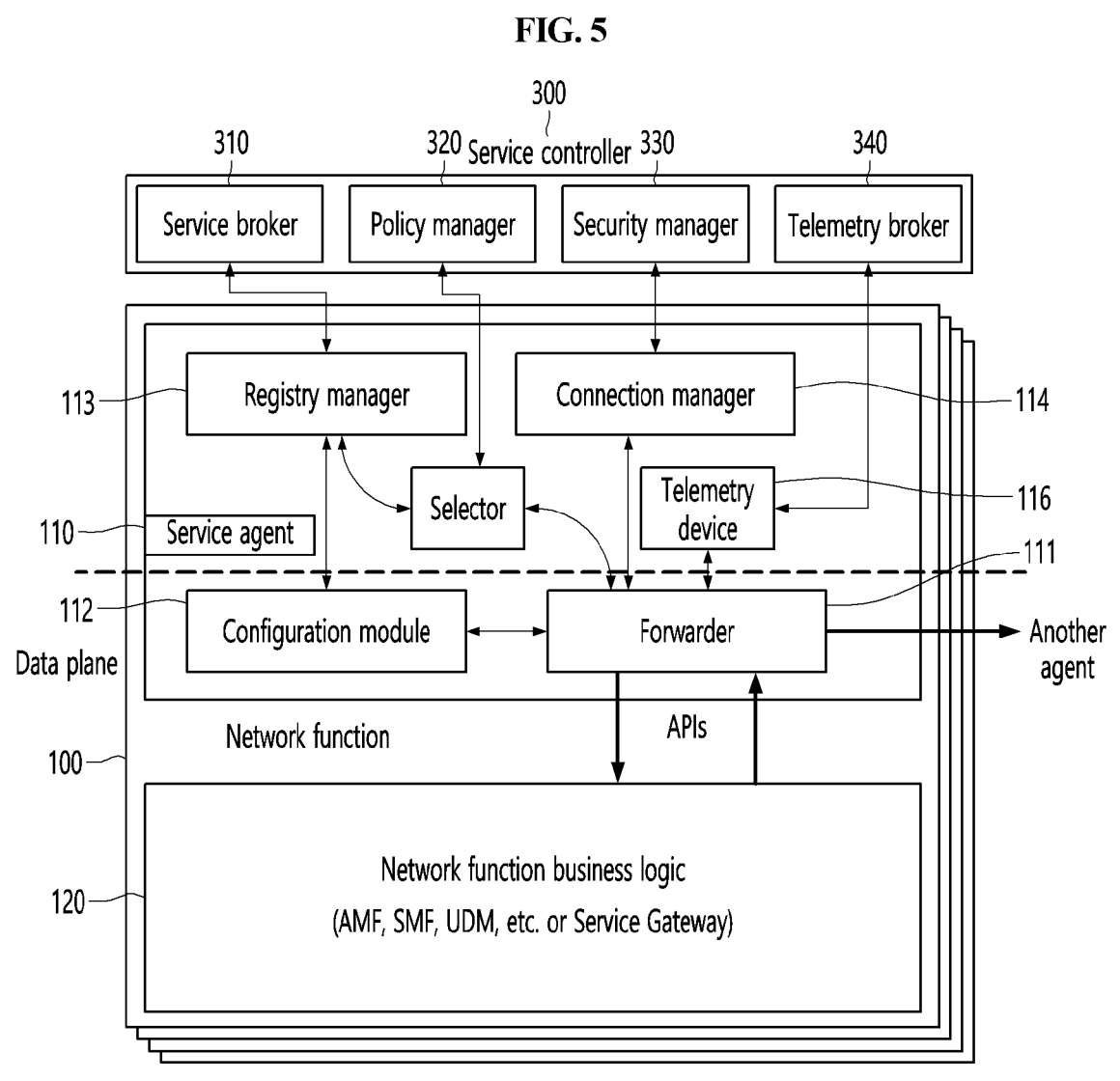

300 Service controller
310 Service broker
320 Policy manager
330 Security manager
340 Telemetry broker
113 Registry manager
114 Connection manager
Selector
116 Telemetry device
110 Service agent
111
112 Configuration module
Forwarder
Data plane
Another agent
Network function
APIs
100
120 Network function business logic
(AMF, SMF, UDM, etc. or Service Gateway)

FIG. 6

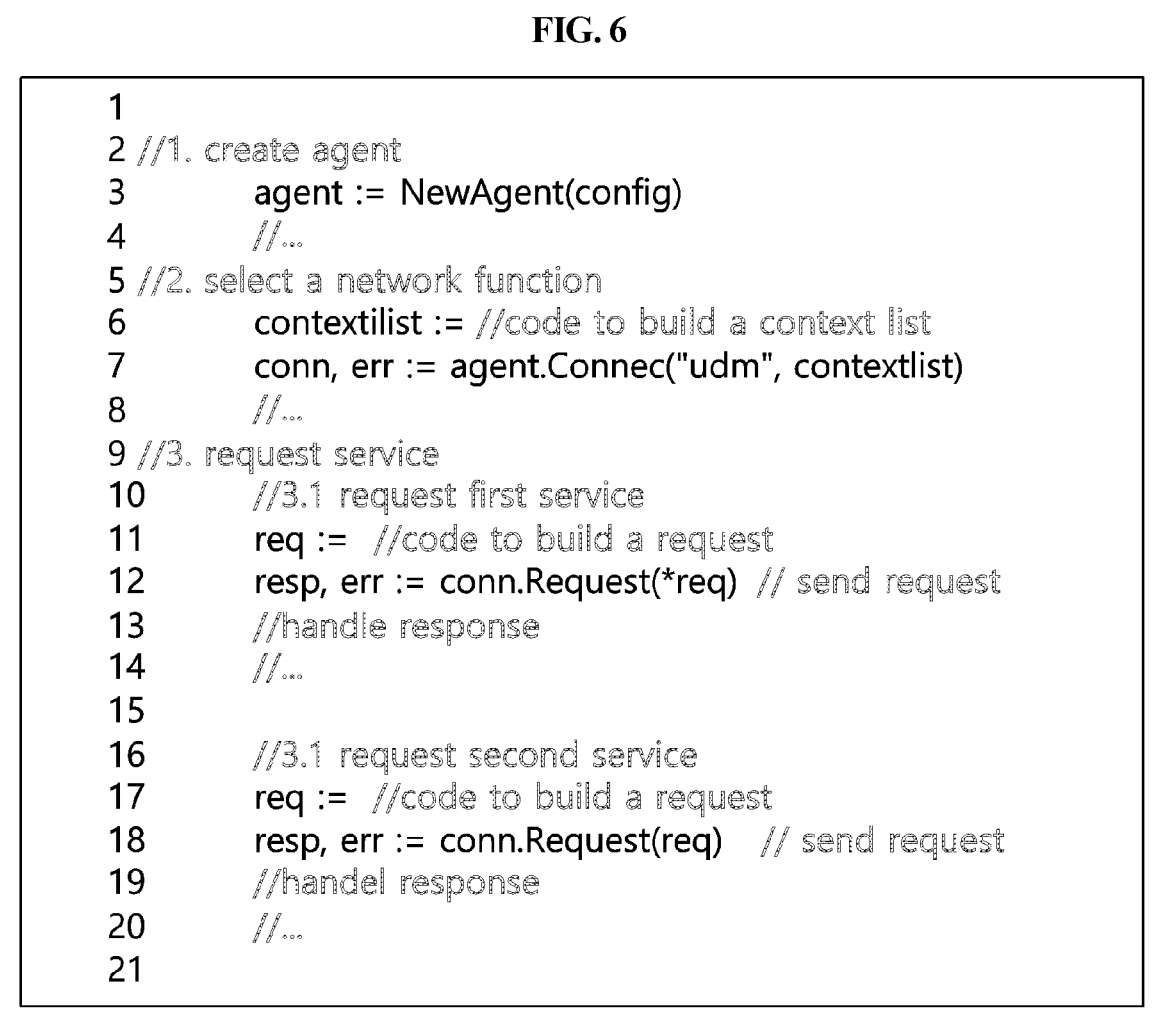

```
//1. create agent
        agent := NewAgent(config)
        //...
//2. select a network function
        contextilist := //code to build a context list
        conn, err := agent.Connec("udm", contextlist)
        //...
//3. request service
        //3.1 request first service
        req :=  //code to build a request
        resp, err := conn.Request(*req)  // send request
        //handle response
        //...

        //3.1 request second service
        req :=  //code to build a request
        resp, err := conn.Request(req)   // send request
        //handel response
        //...
```

FIG. 8

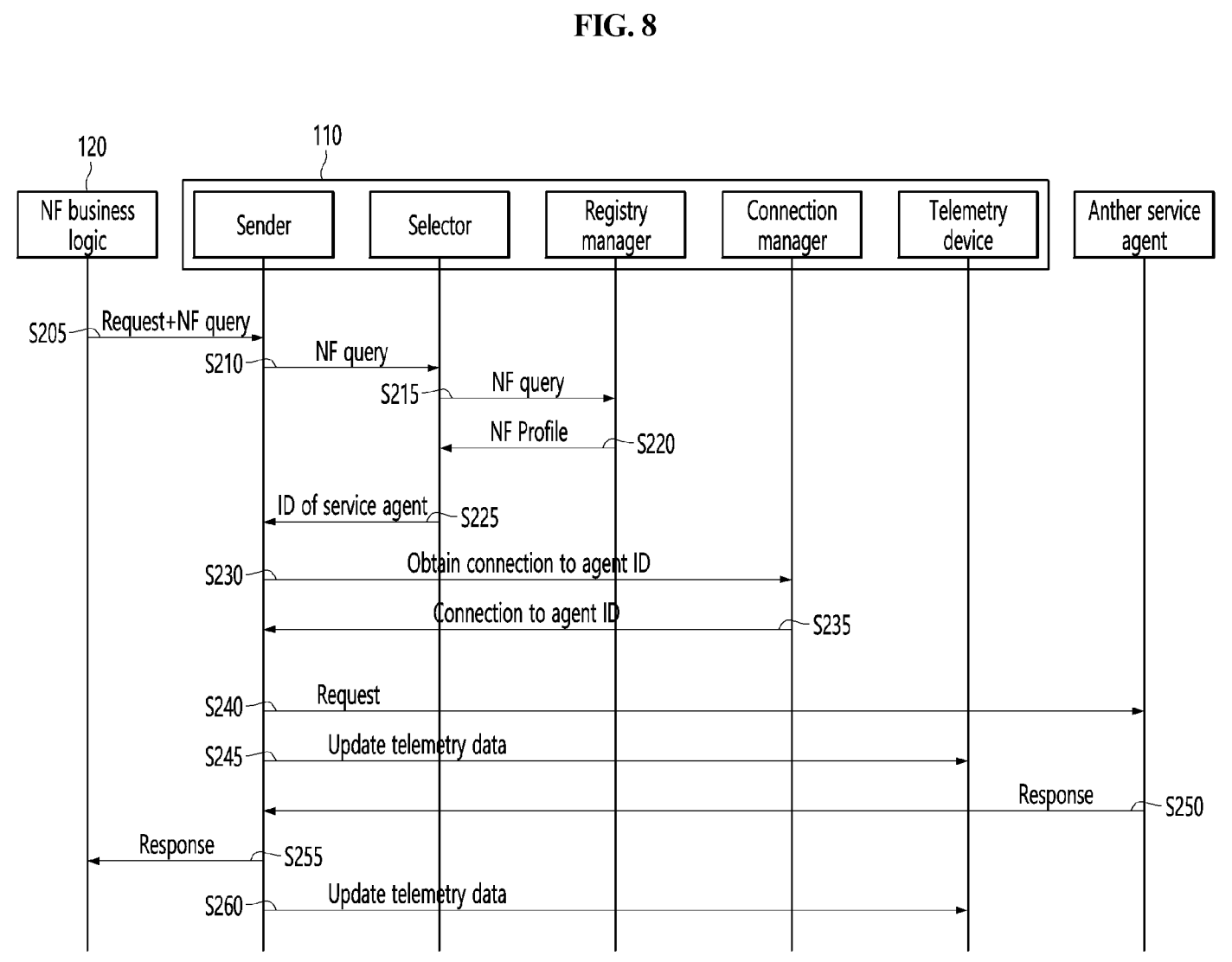

120 NF business logic
110
Sender
Selector
Registry manager
Connection manager
Telemetry device
Anther service agent S205 Request+NF query
S210 NF query
S215 NF query
S220 NF Profile
S225 ID of service agent
S230 Obtain connection to agent ID
S235 Connection to agent ID
S240 Request
S245 Update telemetry data
S250 Response
S255 Response
S260 Update telemetry data

INTEGRATED COMMUNICATION SYSTEM AND COMMUNICATION METHOD THEREOF IN COMMUNICATION SYSTEM

CROSS REFERENCE TO RELATED APPLICATIONS

The present application claims priority to Korean Patent Application No. 10-2022-0105288, filed Aug. 23, 2022, and Korean Patent Application No. 10-2022-0109865, filed Aug. 31, 2022, and Korean Patent Application No. 10-2023-0099581, filed Jul. 31, 2023, the entire contents of which are incorporated herein for all purposes by this reference.

BACKGROUND OF THE INVENTION

1. Field of the Invention

The present disclosure relates to an integrated communication system and a communication method thereof.

2. Description of Related Art

With the advent of new services such as 5G, cloud, and IoT, future application services will require network technology to provide more powerful programmability and simpler integrated network solutions.

SUMMARY OF THE INVENTION

Accordingly, the present disclosure has been made keeping in mind the above problems occurring in the related art, and the present disclosure is intended to propose a network function in an integrated communication system according to one embodiment.

In order to achieve the above objective, according to one embodiment of the present disclosure, there is provided a network function in an integrated communication system. The network function includes a processor and memory, wherein by executing at least one program stored in the memory, the processor performs receiving a request of a service and information about a service agent to provide the service from a business logic of the network function, and receiving a connection object for connecting to the service agent and connecting to a service agent in another network function by using the connection object.

In the network function, by performing the program, the processor may further perform updating telemetry data about the service agent after receiving the connection object.

According to the embodiment, services supported through applications can be seamlessly routed between each NF.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is a diagram illustrating a reference point according to an embodiment;

FIG. 4 is a diagram illustrating an operation between a network function and a service controller according to an embodiment;

FIG. 5 is a diagram illustrating the network function and the service controller according to an embodiment;

FIG. 6 is a pseudocode illustrating a method in which a service NF requests a service from a producer NF according to an embodiment;

FIG. 8 is a flowchart illustrating a service request method of a service agent according to an embodiment.

DETAILED DESCRIPTION OF THE INVENTION

Figure 1:
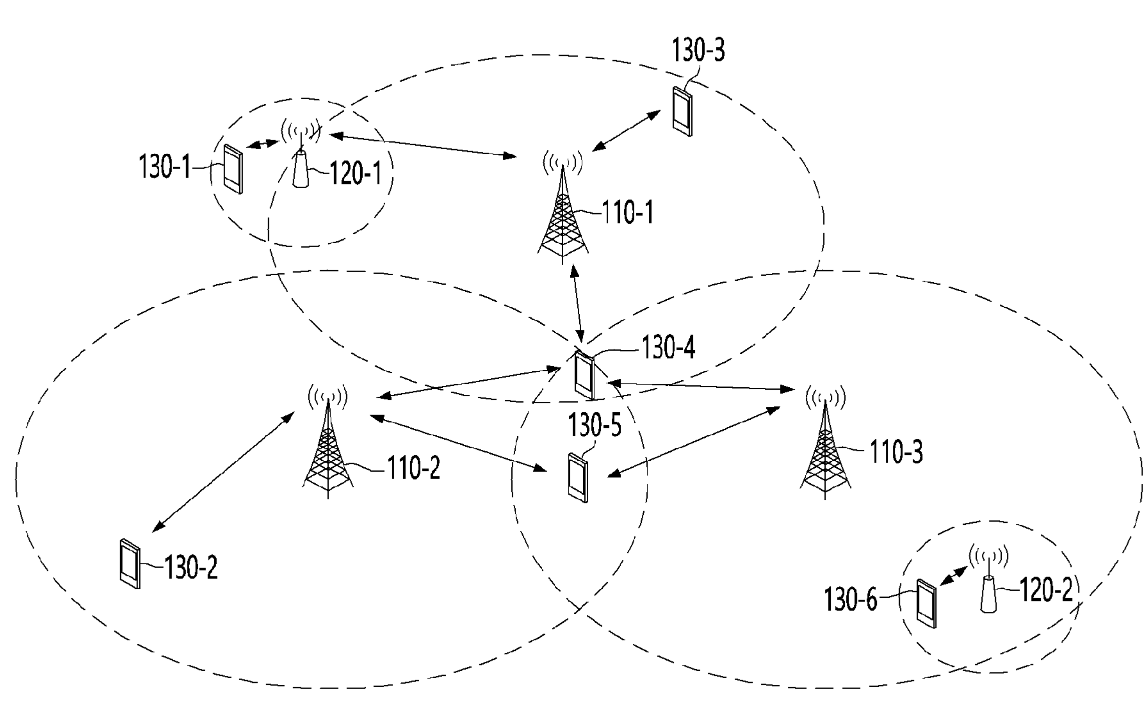
FIG. 1 is a conceptual diagram illustrating a mobile communication system according to an embodiment.

Hereinafter, with reference to the accompanying drawings, embodiments of the present disclosure will be described in detail so that those skilled in the art can easily carry out the art. However, the present disclosure may be implemented in many different forms and is not limited to the embodiments described herein. In addition, in order to clearly describe the present disclosure, parts irrelevant to the present disclosure in the drawings are omitted, and similar reference numerals are attached to similar parts throughout the present specification.

Throughout the present specification, a terminal may refer to user equipment (UE), a mobile station (MS), a mobile terminal (MT), an advanced mobile station (AMS), a high reliability mobile station (HR-MS), a subscriber station (SS), a portable subscriber station (PSS), an access terminal (AT), and a machine type communication (MTC) device, etc., and may include all or some functions of UE, MS, MT, AMS, HR-MS, SS, PSS, and AT, etc.

In addition, a base station (BS) may refer to a node B), an evolved node B (eNB), a gNB, an advanced base station (ABS), a high reliability base station (HR-BS), an access point (AP), a radio access station (RAS), a base transceiver station (BTS), a mobile multihop relay (MMR)-BS, a relay station (RS) that serves as a base station, a relay node (RN) that serves as a base station, an advanced relay station (ARS) that serves as a base station, a high reliability relay station (HR-RS) that serves as a base station, or a small base station [a femto base station (femto BS), a home node B (HNB), a home eNodeB (HeNB), a pico base station (a pico BS), a macro base station (macro BS), a micro base station (micro BS), etc.], and may include all or some functions of NB, eNB, gNB, ABS, AP, RAS, BTS, MMR-BS, RS, RN, ARS, HR-RS, and a small base station.

Throughout the specification, when a part "includes" a certain component, it means that the part may further include other components without excluding other components unless otherwise stated.

In the present specification, each of phrases such as "A or B", "at least one of A and B", "A, B or C", and "at least one of A, B and C" may include any one of items listed together in a corresponding phrase of the phrases, or all possible combinations thereof.

In the present specification, "at least one of A and B" may mean "only A", "only B", or "both A and B". In addition, in the present specification, an expression such as "at least one of A or B" or "at least one of A and/or B" may be interpreted in the same manner as "at least one of A and B".

In addition, in the present specification, "at least one of A, B, and C" may mean "only A", "only B", "only C" or "any combination of A, B, and C". In addition, "at least one of A, B, or C" or "at least one of A, B, and/or C" may mean "at least one of A, B, and C".

Expressions written in a singular form in the present specification may be interpreted in singular or plural expressions unless explicit expressions such as "one" or "single" are used.

In the present specification, "and/or" includes each of mentioned elements and every combination of one or more of the mentioned elements.

In the present specification, terms including ordinal numbers such as first, second, etc. may be used to describe various components, but the components are not limited by the terms. The terms are only used for the purpose of distinguishing one component from another component. For example, a first element may be termed a second element, and similarly, a second element may be termed a first element, without departing from the scope of the present disclosure.

In the flowchart described with reference to the drawings in the present specification, the order of operations may be changed, several operations may be merged, a certain operation may be divided, and a specific operation may not be performed.

A communication network to which embodiments according to the present specification are applied will be described. The communication network may be a 4G communication network (e.g., a long-term evolution (LIE) communication network), a 5G communication network (e.g., a new radio (NR) communication network), and a non-terrestrial network (NTN), etc. Throughout the present specification, a network may, for example, include wireless internet such as wireless fidelity (WiFi), portable internet such as wireless broadband internet (WiBro) or world interoperability for microwave access (WiMax), 2G mobile communication network such as global system for mobile communication (GSM) or code division multiple access (CDMA), 3G mobile communication network such as wideband code division multiple access (WCDMA) or CDMA2000, 3.5G mobile communication network such as high speed downlink packet access (HSDPA) or high speed uplink packet access (HSUPA), 4G mobile communication network such as long term evolution (LTE) network or LTE-Advanced network, and 5G mobile communication network, etc.

Throughout the present specification, a terminal may be referred to as a terminal, an access terminal, a mobile terminal, a station, a subscriber station, a mobile station, a portable subscriber station, a node, or a device, etc.

Here, a terminal may include a desktop computer capable of communication, a laptop computer, a tablet, a PC, a wireless phone, a mobile phone, a smart phone, a smart watch, a smart glass, an e-book reader, a portable multimedia player (PMP), a handheld game machine, a navigation device, a digital camera, digital multimedia broadcasting (DMB) player, a digital audio recorder, a digital audio player, a digital picture recorder, a digital picture player, a digital video recorder, and a digital video player, etc.

Throughout the present specification, a base station may be referred to as a NodeB, an evolved NodeB, a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), or a relay node, etc.

FIG. 1 is a conceptual diagram illustrating a mobile communication system according to an embodiment.

Referring to FIG. 1, the communication system 100 may include a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE), LTE advanced (LTE-A)), and 5G communication (e.g., new radio (NR)) specified in a 3rd generation partnership project (3GPP) standard. 4G communication may be performed in a frequency band of 6 GHz or less, and 5G communication may be performed in a frequency band of 6 GHz or more as well as a frequency band of 6 GHz or less.

For example, for 4G communication and 5G communication, the plurality of communication nodes may support communication protocol based on code division multiple access (CDMA), communication protocol based on wideband CDMA (WCDMA), communication protocol based on time division multiple access (TDMA), communication protocol based on frequency division multiple access (FDMA), communication protocol based on orthogonal frequency division multiplexing (OFDM), communication protocol based on filtered OFDM, communication protocol based on CP (cyclic prefix)-OFDM, communication protocol based on discrete Fourier transform-spread-OFDM (DFT-s-OFDM), communication protocol based on orthogonal frequency division multiple access (OFDMA), communication protocol based on single carrier (SC)-FDMA, non-orthogonal multiple access (NOMA), communication protocol based on generalized frequency division multiplexing (GFDM), communication protocol based on filter bank multi-carrier (FBMC), communication protocol based on universal filtered multi-carrier (UFMC), and communication protocol based on space division multiple access (SDMA), etc.

In addition, the communication system 100 may further include a core network. When the communication system 100 supports 4G communication, the core network may include a serving-gateway (S-GW), a packet data network (PDN)-gateway (P-GW), and a mobility management entity (MME), etc. When the communication system 100 supports 5G communication, the core network may include a user plane function (UPF), a session management function (SMF), and an access and mobility management function (AMF), etc.

Meanwhile, the plurality of communication nodes 110-1, 110-2, 110-3, 120-1, 120-2, 130-1, 130-2, 130-3, 130-4, 130-5, and 130-6 or a network function constituting the communication system 100 may each have the following structure.

Figure 2:
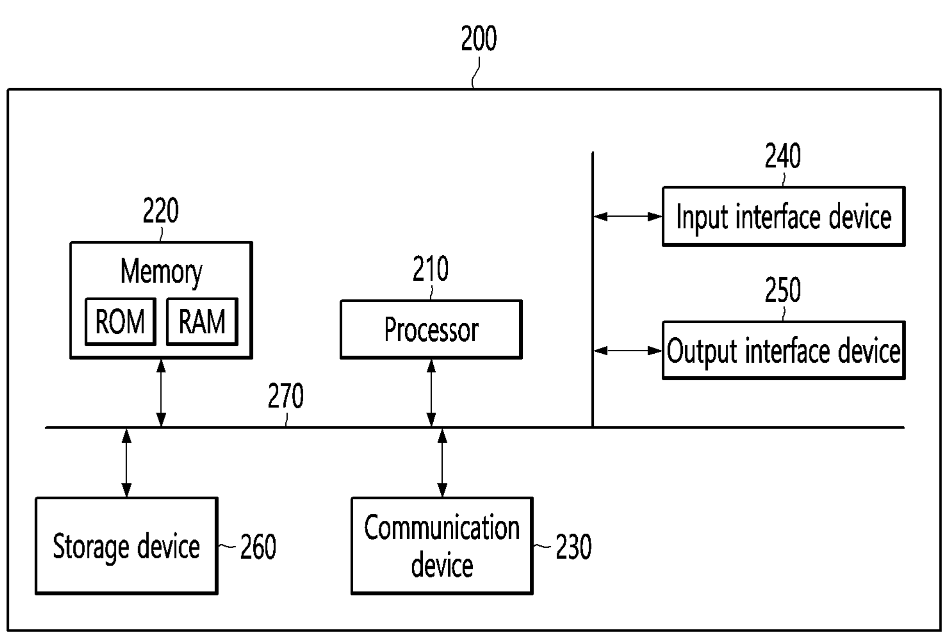
FIG. 2 is a diagram illustrating a device configuration according to an embodiment.

FIG. 2 is a diagram illustrating a device configuration according to the embodiment. Referring to FIG. 2, a communication node 200 (a network function) may include at least one processor 210, a memory 220, and a transceiver 230 connected to a network to perform communication. In addition, the communication node 200 may further include an input interface device 240, an output interface device 250, and a storage device 260, etc. Each component included in the communication node 200 is connected by a bus 270 to communicate with each other.

However, each component included in the communication node 200 may be connected to each other through an individual interface or an individual bus relative to the processor 210 instead of the common bus 270. For example, the processor 210 may be connected to at least one of the memory 220, the transceiver 230, the input interface device 240, the output interface device 250, and the storage device 260 through a dedicated interface.

The processor 210 may execute a program command stored in at least one of the memory 220 and the storage device 260. The processor 210 may refer to a central processing unit (CPU), a graphics processing unit (GPU), or a dedicated processor in which methods according to embodiments of the present invention are performed. Each of the memory 220 and the storage device 260 may be configured as at least one of a volatile storage medium and a non-volatile storage medium. For example, the memory 220 may be configured as at least one of read only memory (ROM) and random access memory (RAM).

Referring back to FIG. 1, the communication system 100 may include a plurality of base stations 110-1, 110-2, 110-3, 120-1, and 120-2, and a plurality of terminals 130-1, 130-2, 130-3, 130-4, 130-5, and 130-6). The communication system 100 including the base stations 110-1, 110-2, 110-3, 120-1, and 120-2, and the terminals 130-1, 130-2, 130-3, 130-4, 130-5, and 130-6 may be referred to as an "access network". Each of the first base station 110-1, the second base station 110-2, and the third base station 110-3 may form a macro cell. Each of the fourth base station 120-1 and the fifth base station 120-2 may form a small cell. The fourth base station 120-1, the third terminal 130-3, and the fourth terminal 130-4 may belong to the cell coverage of the first base station 110-1. The second terminal 130-2, the fourth terminal 130-4, and the fifth terminal 130-5 may belong to the cell coverage of the second base station 110-2. The fifth base station 120-2, the fourth terminal 130-4, the fifth terminal 130-5, and the sixth terminal 130-6 may belong to the cell coverage of the third base station 110-3. The first terminal 130-1 may belong to the cell coverage of the fourth base station 120-1. The sixth terminal 130-6 may belong to the cell coverage of the fifth base station 120-2.

Here, each of the plurality of base stations 110-1, 110-2, 110-3, 120-1, and 120-2 may be referred to as NodeB, an evolved NodeB), gNB, a base transceiver station (BTS), a radio base station), a radio transceiver, an access point, or access node, etc. Each of the plurality of terminals 130-1, 130-2, 130-3, 130-4, 130-5, and 130-6 may be referred to as user equipment (UE), a terminal, an access terminal, a mobile terminal, a station, a subscriber station, a mobile station, a portable subscriber station, a node, or a device, etc.

Meanwhile, each of the plurality of base stations 110-1, 110-2, 110-3, 120-1, and 120-2 may operate in a different frequency band or may operate in the same frequency band. Each of the plurality of base stations (110-1, 110-2, 110-3, 120-1, 120-2) may be connected to each other through an ideal backhaul link or a non-ideal backhaul link, and may exchange information with each other through the ideal backhaul link or non-ideal backhaul link. Each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to a corresponding terminal 130-1, 130-2, 130-3, 130-4, 130-5, or 130-6, and may transmit a signal received from the corresponding terminal 130-1, 130-2, 130-3, 130-4, 130-5, or 130-6 can transmit to the core network.

As an example, the 5G system is configured as architecture based on an interaction between network functions (NFs). For example, as a core network of a 5G system, 5GC may include various entities. Specifically, an access and mobility management function (AMF) may manage access and mobility of a terminal. In addition, AMF may perform a function of managing non-access stratum (NAS) security. In addition, AMF may perform a function of handling mobility of a terminal in an idle state.

In addition, a session management function (SMF) may manage sessions. For example, the SMF may perform a function of allocating a terminal internet protocol (IP) address and control a protocol data unit (PDU) session.

In addition, a policy control function (PCF) may perform a function of controlling a policy. Furthermore, the 5GC may include a user plane function (UPF) that performs a function of controlling a user plane. The UPF, which is a gateway function for transmitting and receiving data, may perform all or part of user plane functions of a serving gateway (S-GW) and a packet data network gateway (P-GW) of the previous mobile communication system (4G). In addition, the UPF may perform a function of handling PDU. Furthermore, the 5GC may include an application function (AF) for controlling an application function. The AF may be a function for providing a plurality of services to a terminal. In addition, the 5GC may include unified data management (UDM) that manages unified data. Here, the UDM may perform a function of managing subscriber information.

Figure 3:
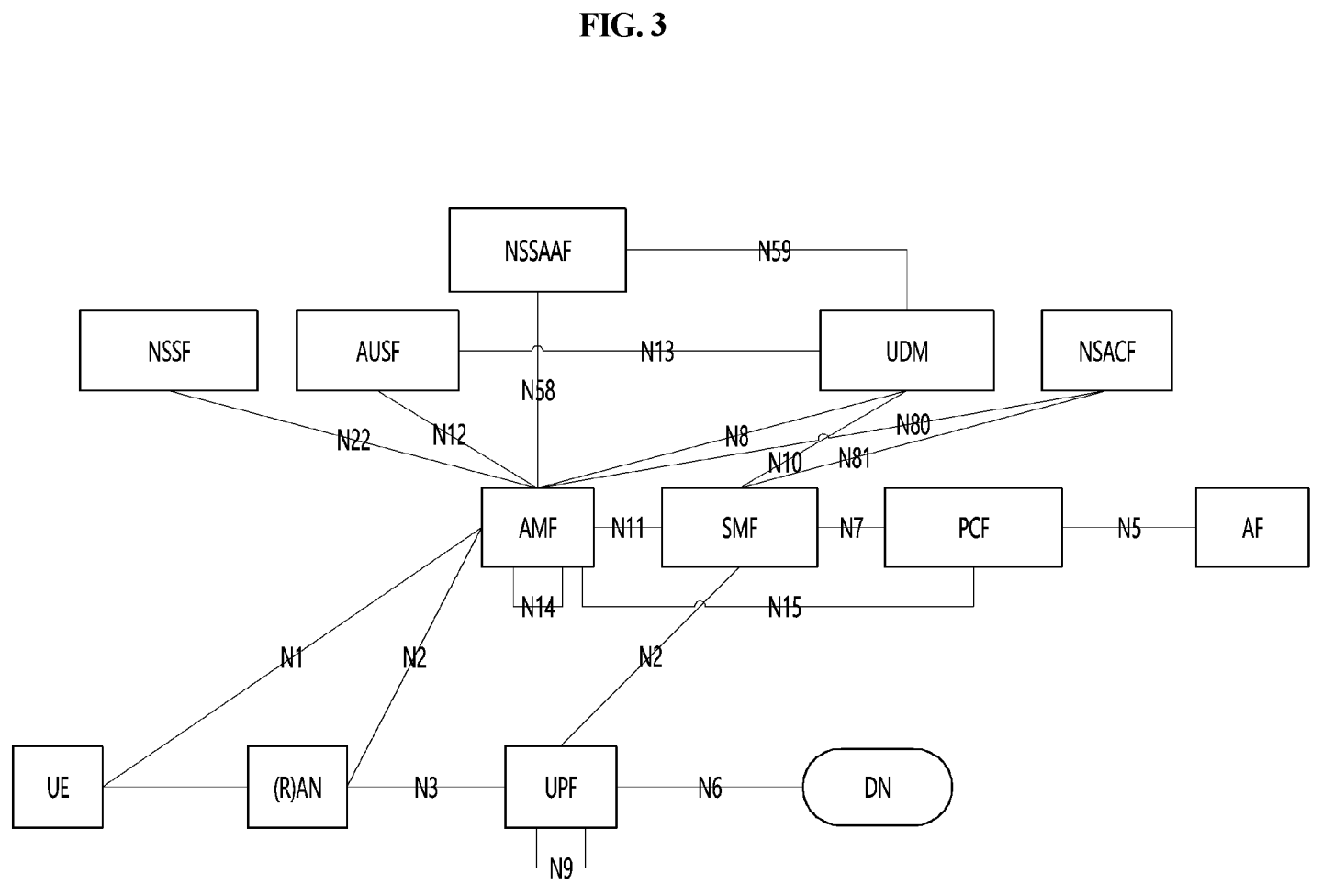

FIG. 3 is a diagram illustrating a reference point according to the embodiment of the present disclosure. Referring to FIG. 3, the reference point may indicate interaction between NF services within NFs described by a point-to-point reference point between two network functions (NFs). For example, N1 may be a reference point between a terminal UE and an access management function (AMF). N2 may be a reference point between (R)AN and AMF. N3 may be a reference point between (R)AN and a user plane function (UPF). Other reference points may be reference points as shown in Table 1 below, but may not be limited thereto.

TABLE 1

| |
|---|
| N1: Reference point between the UE and the AMF. |
| N2: Reference point between the (R)AN and the AMF. |
| N3: Reference point between the (R)AN and the UPF. |
| N4: Reference point between the SMF and the UPF. |
| N5: Reference point between the PCF and an AF or TSN AF. |
| N6: Reference point between the UPF and a Data Network. |
| N7: Reference point between the SMF and the PCF. |
| N8: Reference point between the UDM and the AMF. |
| N9: Reference point between two UPFs. |
| N10: Reference point between the UDM and the SMF. |
| N11: Reference point between the AMF and the SMF. |
| N12: Reference point between AMF and AUSF. |
| N13: Reference point between the UDM and Authentication Server function the AUSF. |
| N14: Reference point between two AMFs. |
| N15: Reference point between the PCF and the AMF in the case of non-roaming scenario, PCF in the visited network and AMF in the case of roaming scenario. |
| N16: Reference point between two SMFs, (in roaming case between SMF in the visited network and the SMF in the home network). |
| N16a: Reference point between SMF and I-SMF. |
| N17: Reference point between AMF and 5G-EIR. |
| N18: Reference point between any NF and UDSF. |
| N19: Reference point between two PSA UPFs for 5G LAN-type service. |
| N22: Reference point between AMF and NSSF. |

The 5G mobile core network of FIGS. 1 to 3 described above is designed as a single structure, but after 5G (e.g. 6G), the core network is required to be designed with a service-based architecture. For example, a network may be configured as a network function, which is a software component that operates on the basis of interaction, and through this, may have horizontal scalability and flexibility to meet various detailed requirements. In addition, the mobile core network may operate on the basis of a maturing cloud-native technology in which network functions are deployed in multiple distributed clouds. Here, the current structure of a 5G mobile core has limitations in supporting cloud-native technology, so a paradigm shift may be required. Considering the above points, the core network may be designed as a service based architecture (SBA). An SBA-based core network is a software component with various functions, which can include network functions (NFs) decomposed. Here, the NFs may expose services in the form of a restful application programming interface (API). That is, when a network is decomposed into NFs constituting a software component, flexible and scalable deployments may be possible, which enables a service-based structure. In addition, for example, in the SBA-based core network, NFs may be containerized and deployed in multiple clouds, and may allow resources to be shared and dynamically assigned to service operations through cloud technology. Through the above, it is possible to establish a flexible and scalable core network, through which various services may be provided.

For example, after 5G, various types of services are expected to appear, and when the above services are considered, the core network is required to be designed on the basis of SBA. In the following, an operation method in the SBA-based core network will be described in consideration of the above points. Based on the current 5G core network, in a signaling procedure for a terminal, some steps of the procedure may be processed and operated in each NF based on an NF chain, and each NF may be connected through an interface as shown in Table 1 described above. That is, NFs may have static connection relationships between the NFs. However, there is a need for automatic search in consideration of NF search and selection operations in a large-scale dynamic structure. For example, a network repository function (NRF) exists in a current 5G core network, and NFs may be registered in the NRF. An NF may send a query to the NRF to request service and through a response thereto, another NF may be selected. Here, for example, it is difficult to include service search and selection logic inside each NF, and in consideration of the above, a service communication proxy (SCF) may be utilized. The SCF may perform service discovery and selection on behalf of NFs, relieving the NFs of the burden of performing service discovery and selection on its own. However, even when service search and selection are performed by the SCF, the NFs are required to be registered and searched in the NRF. That is, service search and selection may be performed centrally on the basis of the NRF. For example, centralized service search and selection may cause a bottleneck in control plane traffic, and may be delayed occur due to multiple signal search procedures, thereby having limitations.

Here, in an environment where service types are diversified and the number of services is increasing after 5G, a new type of the SBA-based core network described above may be required, and the SBA-based core network may perform a corresponding function without the aforementioned NRF and SCP. For example, during operation based on the SBA-based core network, the role of selecting an appropriate instance of a target service within an application context may be performed by a service agent and a service controller, and common service logic for NF search and selection may be included in the service agent. That is, all network functions may be connected to the service agent, which acts as a proxy to perform service requests and responses on behalf of the network functions, the service agent may perform all service registration/search and selection on behalf of the signal processing logic of the network functions.

Figure 4:
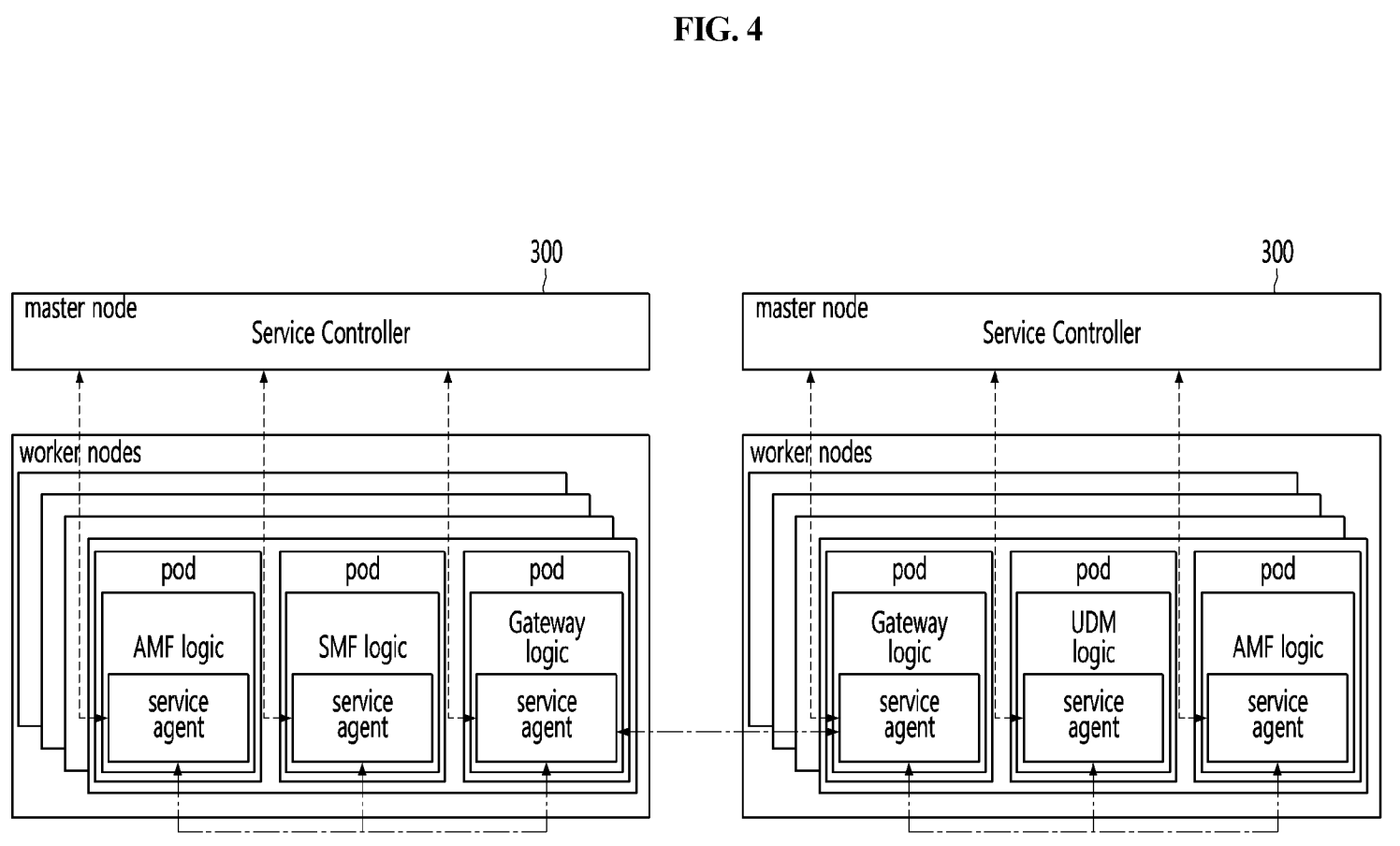

For example, FIG. 4 is a diagram illustrating the service controller and the service agent according to an embodiment. Referring to FIG. 4, the service controller 300 can control a service agent in an individual NF, and each of subagents in an individual NF may have a proxy role that performs service requests and responses on its behalf through connections to each other.

For a more specific example, FIG. 5 is a diagram illustrating the network function and the service controller according to an embodiment. In service based architecture (SBA), the control plane of the 5G core network includes a plurality of network functions (NFs), and each of the network functions may perform a predetermined function.

A signaling procedure for providing services to user equipment (UE) may be configured in a communication chain between NFs, and each NF may process some steps of the signaling procedure. One NF (a consumer NF) may request services from another NF (a producer NF) to perform a predetermined function, and the producer NF may provide multiple services to the consumer NF.

According to one embodiment, the function of a conventional network repository function (NRF) may be performed by the service agent 110 and the service controller 300 included in the network function 100. Service components for applications are registered in an integrated communication system according to the embodiment, so services supported by the applications may be seamlessly routed between applications or programmed logic thereof.

Referring to FIG. 5, the network function 100 according to one embodiment may include the service agent 110. For example, the network function (NF) 100 may include the service agent 110 and a business logic layer 120. The service agent 110 may include an API to search for a service and provide a response to a request. The service agent 110 may perform service search and selection, and these procedures may proceed without the knowledge of the business logic layer. In addition, the service agent 110 may be included in both a control plane layer and a data plane layer. Here, the service agent 110 may include a forwarder 111 and a configuration module 112 operating in the data plane layer, and may include a registry manager 113, a connection manager 114, a selector 115, and a telemetry device 116 operating in the control plane layer. In addition, the service controller 300 according to an embodiment may include a service broker 310, a policy manager 320, a security manager 330, and a telemetry broker 340.

For example, the forwarder 111 may be a core module of the service agent 110 located in the data plane layer. The forwarder 111 may obtain a request of the business logic layer 120 and transfer the obtained request to another service agent, and transfer a response received from the another service agent to the business logic layer 120. In addition, the forwarder 111 may maintain a transport connection list, and thus may perform a forwarding operation to the another service agent or receive a request or response incoming from the another service agent. In addition, the configuration module 112 of the service agent 110 may maintain and manage setting information related to the operation of the service agent. Furthermore, the configuration module 112 may manage the another service agent and a connection list, and may include policy information for selecting an NF from a candidate list.

In addition, in the control plane layer, the registry manager 113 may notify an NF and implement all procedures for searching for another NF of interest within the integrated communication system. Furthermore, the registry manager 113 may interact with the service controller 300 and the service broker 310 so as to maintain synchronization with the another NF in the integrated communication system. For example, when the forwarder 111 requests a new remote service, the registry manager 113 may request candidate location lists of the target service from a registration and search component, select one of the candidate location lists, and perform connection for transmitting the request.

In addition, the connection manager 114 may cooperate with the security manager 330 of the service controller 300 to create secure connection between service agents 110. The security manager 330 may generate a private key and distribute a signed certificate for the service agent. After that, the service agent 110 may use corresponding information to preset secure connection for forwarding the data plane layer traffic.

In addition, in the control plane, the selector 115 may perform selection by implementing a load balancing algorithm. For example, the policy manager 320 of the service controller 300 may determine a load balancing algorithm used by the service agent 110.

Finally, the telemetry device 116 may perform observability of the integrated communication system together with the telemetry broker 340 of the service controller 300. Since all signaling traffic between NFs may be changed by the service agent, the telemetry device 116 may collect traffic statistics and make the traffic statistics available in a network. Here, the telemetry broker 340 may obtain telemetry measurement data collected from the service agent for data analysis.

An application context may be introduced into the integrated communication system according to the embodiment. In one embodiment, the application context may be used to allow groups of network functions to interact with each other to implement a specific application logic, and may indicate a public land mobile network (PLMN), a data network name (DNN), a network slice, or a network slice instance. The application context may be determined or defined according to the needs of application.

Within a context associated with an application, there may be various instances of a network function deployed. From point of view of the application, the various instances in the context are identical, so the instances may be called interchangeably. For example, instances of an AMF in a slice may be identical in handling signaling procedures in the corresponding slice.

A context according to one embodiment may be expressed as a key-value pair ($C^k$, $C^v$). $C^k$ may be a context identifier indicating a primitive type of a context. $C^v$ may represent a value of the corresponding primitive type. A new context may be created by taking the intersection of a set of existing contexts.

$$C = \bigcap_{i=1}^{n} C_i \quad \text{[Equation 1]}$$

The same context may be represented as a list of key-value pairs.

$$C = \{(C_i^k, C_i^v)\} \quad \text{[Equation 2]}$$

When a consumer NF is required to find a producer NF to request a service in a specific context, the consumer NF may send a list of key-value pairs indicating the type of context and producer to the integrated communication system through the service agent 110. The integrated communication system may identify all currently deployed instances of a corresponding producer NF by using information provided by the consumer NF, and can select the producer NF to forward the request of the consumer NF to.

FIG. 6 is a pseudocode illustrating a method in which a service NF requests a service from a producer NF according to an embodiment.

In the integrated communication system according to the embodiment, an interface between the service agent (or a library of the service agent) and the business logic layer 120 of the NF may be defined by using the application context.

Referring to FIG. 6, the NF 100 may create an agent object with a predetermined configuration parameter (line 3). Here, the configuration parameter may be loaded from a configuration file by the configuration module 112. When the agent object is created, the service agent 110 in the NF 100 may register itself on the service controller 300 of the integrated communication system so that another agent can request service.

During the signaling procedure, the NF 100 may establish a context for identifying a producer in order to request service from the producer NF (line 6). The NF 100 may request the service agent 110 to search for a target agent by providing a list of contexts and a producer type (line 6). The service agent 110 may proceed with a search and selection process and return to a caller a connection object (conn) representing transmission connection to a selected producer. The connection may last for a predetermined period of time to process a plurality of service requests (lines 9-20).

Figure 7:
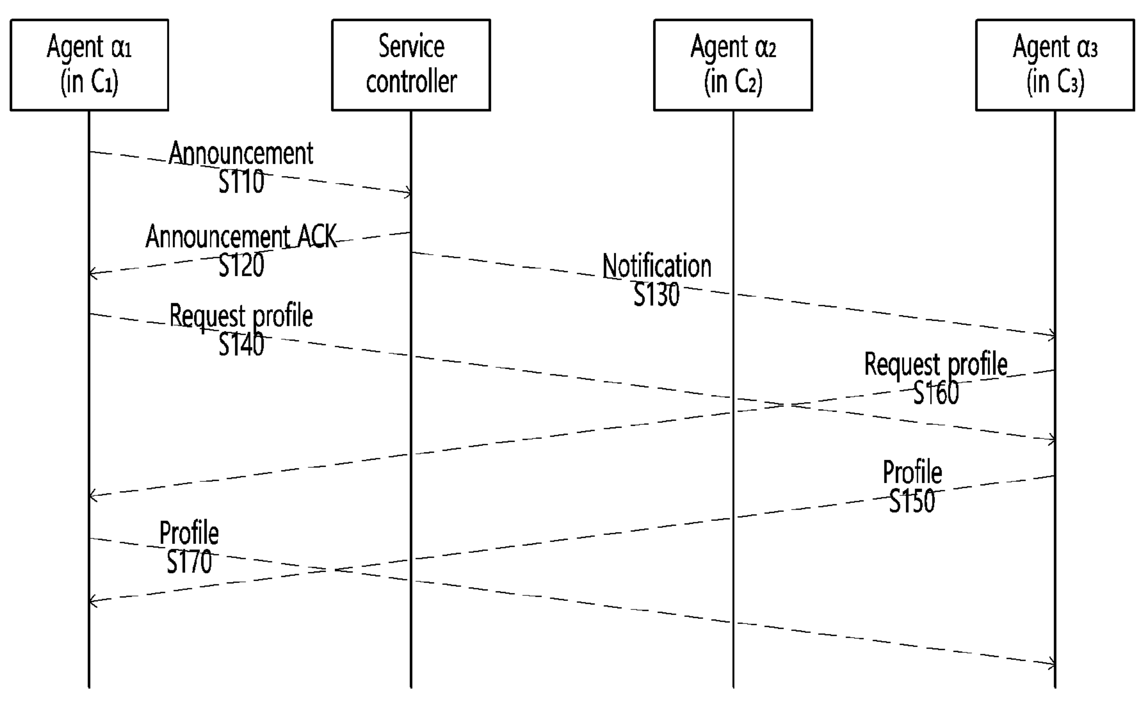
FIG. 7 is a flowchart illustrating a service registration method of a network function according to the embodiment.

FIG. 7 is a flowchart illustrating a service registration method of a network function according to the embodiment.

According to the integrated communication system according to the embodiment, service search and service selection may be implemented in various ways by separating service implementation and service deployment from each other. The integrated communication system according to the embodiment may provide a distributed service registry platform with excellent responsiveness and scalability.

In the integrated communication system according to the embodiment, an entire service registry is not kept in a centralized entity, but may be distributed in a service agent of each NF. Some service registries, managed by the service agent in each NF, may hold records of services for a particularly related application context.

In one embodiment, the service controller may act as an intermediary to selectively notify a service agent in each NF of registration updates. Search responses may be faster when the service agent holding a registry record is co-located with the consumer of service.

Referring to FIG. 7, when the network function instance $nf_1$ of the service agent $a_1$ of the integrated communication system according to one embodiment is initiated, the service agent $a_1$ may announce new registration of the service agent $a_1$ or the network function instance $nf_1$ to the service controller 300 in the integrated communication system at S110.

In one embodiment, the address of the service controller 300 may be configured in advance in each of service agents. In FIG. 7, the agent $a_1$ may operate within the application context (or a primitive context) C1.

The announcement of the agent $a_1$ may include at least one of the address of the agent $a_1$, a list ($L_0=\{C_1\}$) of a context (a main context) in which $nf_1$ operates, and a list ($L_i$={$C_1$}) of a context related to $nf_1$. The list $L_i$ of the context related to $nf_1$ may include a context (a context of interest) monitored by the agent $a_1$ or $nf_1$.

The service controller 300 may manage a list of the announced service agent. In addition, the service controller 300 may manage the main context in which the announced service agent is operating and the context of interest monitored or to be monitored by the announced service agent.

When the announcement of the agent $a_1$ is received, the service controller 300 may transmit the location of the agent belonging to the main context to the agent $a_1$ (S120). In one embodiment, a main context $C_1$ may be included in the list of a context in which $nf_1$ operates. In FIG. 6, the service controller 300 may transmit the address of an agent $a_3$ to the agent $a_1$ as a response.

Referring to FIG. 7, the service controller 300 may inform all service agents in the context $C_1$ of the registration of the agent $a_1$ or the network function instance $nf_1$ at S130. In one embodiment, agent $a_3$ may receive a notification from the service controller 300, wherein the notification may inform an update occurrence in the context $C_1$.

The agent $a_1$ may check the list of agents announced in the response of the service controller 300, and transmit a profile request to all agents in the list to obtain profiles of each agent at S140. An agent receiving the profile request from the agent $a_1$ may be an agent operating in context $C_1$. Next, the agent $a_1$ may receive a profile of a corresponding agent from an agent (the agent $a_3$, etc.) in the context $C_1$ at S150.

In addition, the agent $a_3$ may request the profile of the agent $a_1$ from the agent $a_1$ at S160 and may receive the profile of the agent $a_1$ from the agent $a_1$ at S170.

FIG. 8 is a flowchart illustrating a service request method of a service agent according to an embodiment.

Referring to FIG. 8, the business logic layer 120 of the NF 100 may transmit a service request and an NF query (nf-query) (a context is included) to the forwarder in the service agent 110 at S205. According to one embodiment, the forwarder may be the same component as the sender of FIG. 8.

The forwarder receiving the request and the NF query may select another NF to request service by calling a method in the selector and inputting the NF query to the called method at S210.

The selector may search for another NF candidate by calling a method in the registry manager and inputting an NF query to the called method at S215. Next, the registry manager may return a list of an NF profile to the selector at S220.

The selector may select one NF from a list received by using load balancing, and return the ID (agent-id) of the remote agent of the selected NF to the forwarder at S225 (here, the agent-id may be the ID of the selected NF).

The forwarder may call the connection manager to be connected to the selected remote agent at S230, and the connection manager may return the connection object to the forwarder at S235.

The forwarder may transmit a request to the remote agent by using the received connection object at S240. In addition, the forwarder may transmit telemetry data (a telemetry update report) updated by transmission of the request to the remote agent to the telemetry device at S245.

After that, the remote agent may return a response to the request to the forwarder at S250, and the forwarder may forward the returned response to the business logic layer 120 of the NF at S255. In addition, the forwarder may transmit the telemetry update report to the telemetry device at S260.

Figure 9:
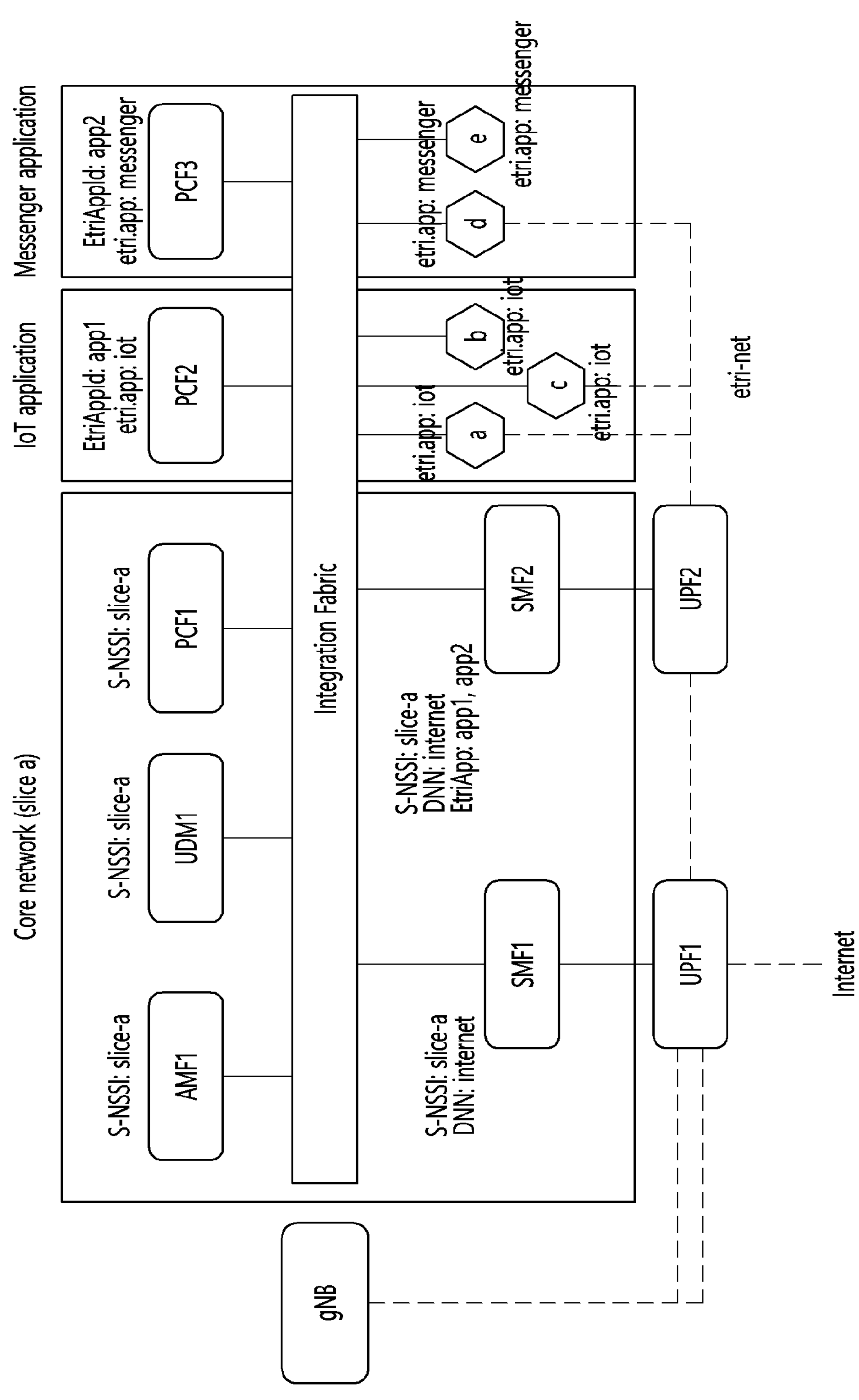
FIG. 9 is a conceptual diagram illustrating a service providing method in an application context according to an embodiment.

FIG. 9 is a conceptual diagram illustrating a service providing method in the application context according to an embodiment.

In FIG. 9, the concept of the application context is illustrated, and a method in which a vertical network creates a new context in order to provide a service through an application is illustrated. In FIG. 9, a label displayed next to NF is a list of a key-value pair representing a specific context.

In FIG. 9, a network slice (NSI=slice-a) may be provided to the vertical network. All network functions (AMF1, UDM1, PCF1, SMF1, and SMF2) in the slice may belong to a context: NSI=slice-a. SMF1 may belong to context: DNN="internet", and the SMF2 may belong to a context: DNN="etri-net". The SMF2 may manage a PDU session for connecting a vertical data network (etri-net) in which an application host is deployed. Network slice instance (NSI) and DNN are predefined context IDs within a 5G network.

All network functions (including applications of the vertical network) may be deployed within a single cluster by a network operator.

In one embodiment, two applications, which are an IoT application composed of services a, b, and c, and a messenger application composed of services d and e, may be provided through a vertical network. Since the SMF2 manages user plane traffic for the vertical data network, the SMF2 is required to be programmed to steer traffic to an appropriate application. This can be done indirectly through an application-controlled the PCF.

In one embodiment, the vertical network may request to create two new context IDs. In FIG. 9, EtriAppId may be an external application identifier and etri.app may be an internal application identifier. The vertical network can implement services by providing applications as follows.

All services (a, b, and c) of the IoT application may be assigned to a context: etri.app=iot. All services (d and e) of the messenger application may be assigned to a context: etri.app=messenger.

Two PCF instances that can interact with the existing network for traffic steering may be newly deployed. A PCF2 may be assigned to a context: {etri.app=iot, EtriAppId=app1} and a PCF3 may be assigned to context: {etri.app=message, EtriAppId=app2}.

The SMF2 may be reconfigured to further include EtriAppId=app1,app2.

Through this configuration method, the SMF2 may perform traffic steering and search and select the PCF2 and PCF3. This may be performed because the SMF2 and the PCF2 belong to EtriAppId=app1 and the SMF2 and PCF3 belong to EtriAppId=app2.

The service of IoT may search for the PCF2 (within the same context etri.app=iot) and control the operation of the PCF2, and the service of the message may search for the PCF3 (within the same context etri.app=messenger) and control the operation of the PCF3.

According to various embodiment of the present disclosure, the network function in the integrated communication system includes the processor and the memory. By executing at least one program stored in the memory, the processor may perform receiving a request of a service and information about the service agent to provide the service from the business logic of the network function, and receiving the connection object for connecting to the service agent and connecting to a service agent in another network function by using the connection object.

According to an embodiment, by executing the program, the processor may further perform updating telemetry data about the service agent after receiving the connection object.

Meanwhile, the embodiments of the present disclosure are not implemented only through the device and/or method described above, and may be implemented through a program that realizes functions corresponding to the configuration of the embodiments of the present disclosure or through a recording medium in which the program is recorded, and such an implementation can be easily implemented by those skilled in the art from the description of the above-described embodiments. Specifically, methods (e.g., a network management method, a data transmission method, and a transmission schedule creation method, etc.) according to the embodiment of the present disclosure are implemented in the form of program commands that can be executed through various computer means, and may be recorded in a computer readable medium. The computer readable medium may include program commands, data files, and data structures, etc. individually or in combination. Program commands recorded in the computer readable medium may be specially designed and configured for the embodiments of the present disclosure, or may be known and usable to those skilled in the art in the field of computer software. A computer-readable recording medium may include a hardware device configured to store and execute program commands. For example, the computer-readable recording medium include magnetic media such as a hard disk, a floppy disk and a magnetic tape, optical media such as a CD-ROM and a DVD, magneto-optical media such as a floptical disk, ROM, RAM, and flash memory, etc. The program commands may include high-level language codes that can be executed by a computer through an interpreter as well as machine language codes generated by a compiler.

Although the embodiments of the present disclosure have been described in detail above, the scope of the claims of the present disclosure is not limited thereto, and various modifications and improvements of those skilled in the art using the basic concept of the present disclosure defined in the following claims also belong to the scope of the claims of the present disclosure.

What is claimed is:

1. A network function of a communication system, the network function comprising:

a communication device, and a processor operably connected with the communication device, wherein the processor controls a business logic layer of the network function to transmit a request of a service and an NF query (nf-query) to a service agent of the network function, wherein the NF query comprises a context, with the context comprising a context for identifying a service producer, wherein the service agent forwards the service request to another service agent of another network function based on the context, receives a response to the service request of another service agent from the other service agent of the other network function, and sends the received response to the business logic layer of the network function, wherein the service agent comprises a forwarder and a registry manager, wherein the forwarder maintains a transport connection list, and wherein when a new remote service is requested by the forwarder, the registry manager selects one of candidate location lists of a target service and performs a configuration operation to be connected thereto.

2. The network function of claim 1, wherein the business logic layer of the network function defines an interface by using an application context.

3. The network function of claim 1, wherein the processor creates an agent object having a predetermined configuration parameter, and registers the network function in a service controller so that the another service agent requests service.

4. The network function of claim 1, wherein the service agent comprises a configuration module, wherein the configuration module maintains and manages setting information related to an operation of the service agent.

5. The network function of claim 1, wherein the service agent comprises a configuration module, wherein the configuration module manages the another service agent and a connection list, and comprises policy information for selecting a network function (NF) from a candidate list.

6. The network function of claim 1, wherein the service agent comprises a registry manager, wherein the registry manager notifies a network function (NF) and performs a procedure for searching for another NF.

7. The network function of claim 1, wherein the service agent comprises a registry manager, wherein the registry manager performs an operation to maintain synchronization with another network function (NF).

8. An operating method of a network function of a communication system, the method comprising:

a process in which a business logic layer of the network function transmits a request of service and an NF query (nf-query) to a service agent of the network function, wherein the NF query comprises a context, with the context comprising a context for identifying a service producer, a process in which the service agent forwards the service request to another service agent of another network function based on the context, receives a response to the service request from the other service agent of the other network function, and sends the received response of the business logic layer of the network function, wherein the service agent comprises a forwarder and a registry manager, the method further comprises a process in which a transport connection list is maintained by the forwarder, and a process in which when a new remote service is requested by the forwarder, the registry manager selects one of candidate location lists of a target service and performs a configuration operation to be connected to.

9. The method of claim 8, wherein the business logic layer of the network function defines an interface by using an application context.

10. The method of claim 8, further comprising:

a process of creating an agent object having a predetermined configuration parameter, and a process of registering the network function in a service controller so that the another service agent requests service.

11. The method of claim 8, wherein the service agent comprises a configuration module, and the method further comprises a process in which setting information related to an operation of the service agent is maintained and managed by the configuration module.

12. The method of claim 8, wherein the service agent comprises a configuration module, and the method further comprises a process in which the another service agent and a connection list are managed by the configuration module, with the configuration module comprising policy information for selecting a network function (NF) from a candidate list.

13. The method of claim 8, wherein the service agent comprises a registry manager, and the method further comprises:

a process in which the registry manager notifies a network function (NF); and a process in which the registry manager performs a procedure for searching for another NF.

14. The method of claim 8, wherein the service agent comprises a registry manager, the method further comprises a process in which the registry manager performs an operation to maintain synchronization with another network function (NF).

* * * * *